(12) United States Patent
Veloso et al.

(10) Patent No.: US 12,492,530 B2
(45) Date of Patent: Dec. 9, 2025

(54) MOBILE WORKING MACHINE

(71) Applicant: Liebherr-Hydraulikbagger GmbH, Kirchdorf/Iller (DE)

(72) Inventors: Daniel Veloso, Memmingen (DE); Christoph Hess, Hergensweiler (DE)

(73) Assignee: LIEBHERR-HYDRAULIKBAGGER GMBH, Kirchdorf/Iller (DE)

( * ) Notice: Subject to any disclaimer, the term of this patent is extended or adjusted under 35 U.S.C. 154(b) by 287 days.

(21) Appl. No.: 18/499,011

(22) Filed: Oct. 31, 2023

(65) Prior Publication Data

US 2024/0150998 A1 May 9, 2024

(30) Foreign Application Priority Data

Nov. 7, 2022 (DE) ...................... 20 2022 106 231.5

(51) Int. Cl.
*E02F 9/20* (2006.01)
*E02F 3/88* (2006.01)
*E02F 9/16* (2006.01)

(52) U.S. Cl.
CPC .......... *E02F 9/2025* (2013.01); *E02F 3/8825* (2013.01); *E02F 9/16* (2013.01); *E02F 9/2012* (2013.01)

(58) Field of Classification Search
CPC .. B62D 1/20; B62D 1/183; B62D 1/16; E02F 9/16
USPC .................... 74/492, 494; 280/771, 774, 779
See application file for complete search history.

(56) References Cited

U.S. PATENT DOCUMENTS

| | | | | |
|---|---|---|---|---|
| 5,673,938 A | * | 10/1997 | Kaliszewski | B62D 1/195 280/779 |
| 2006/0071464 A1 | * | 4/2006 | Priepke | B62D 1/10 280/775 |
| 2006/0095186 A1 | * | 5/2006 | Hendron | B60T 13/662 701/50 |
| 2009/0321171 A1 | | 12/2009 | Hakansson | |

(Continued)

FOREIGN PATENT DOCUMENTS

| EP | 0195886 A1 | 10/1986 |
|---|---|---|
| EP | 0841236 B1 | 8/2002 |

(Continued)

*Primary Examiner* — Christian Chace
*Assistant Examiner* — Ai K Tran
(74) *Attorney, Agent, or Firm* — McCoy Russell LLP

(57) ABSTRACT

The disclosure relates to a mobile working machine comprising a driver's cab for accommodating an operator of the mobile working machine, a control station for the operator arranged in the driver's cab, a primary steering system arranged in front of the control station in the direction of travel of the mobile working machine, and a secondary steering system, arranged laterally offset from the control station in the direction of travel of the mobile working machine, wherein the primary steering system has a steering column section, which cooperates with a steering column mount to transmit a steering actuation to a control unit implementing the desired steering movement, wherein the steering column section and the steering column mount can be connected to each other in a rotationally fixed manner via a plug-in connection, such that the operator is able to dismount the primary steering system depending on a perceived visual restriction.

16 Claims, 3 Drawing Sheets

(56) References Cited

U.S. PATENT DOCUMENTS

2013/0154309 A1*  6/2013  Kamimae .................. B60R 7/04
                                                          296/190.08
2016/0304113 A1* 10/2016  McCurdy .................. B62D 1/18
2019/0152505 A1   5/2019  Hansen et al.
2019/0367072 A1  12/2019  Hansen et al.
2021/0316778 A1  10/2021  Cleodolphi et al.
2021/0355655 A1* 11/2021  Nakayama ............ E02F 9/2004
2023/0356766 A1* 11/2023  Ostertag ................ B62D 1/183

FOREIGN PATENT DOCUMENTS

JP         S63251366 A      10/1988
JP         2016130036 A      7/2016

* cited by examiner

MOBILE WORKING MACHINE

CROSS REFERENCE TO RELATED APPLICATION

The present application claims priority to German Patent Application No. 20 2022 106 231.5 filed on Nov. 7, 2022. The entire contents of the above-listed application are hereby incorporated by reference for all purposes.

TECHNICAL FIELD

The present disclosure relates to a mobile working machine, in particular a digger or similar.

BACKGROUND

Mobile working machines often have a larger chassis with large-diameter tires (or even a chain drive) to provide them with a secure grip on rough and unpaved terrain and so that can move reliably even under these difficult conditions.

SUMMARY

This results in a driver's cab usually being arranged above the chassis, which leads to a considerable height of the cab arrangement above a ground level. This can be seen quite impressively in the example of a digger, as first the undercarriage with the chassis (chain or wheel) is provided and the driver's cab is arranged on the upper carriage, which is arranged rotatably opposite the undercarriage. Depending on the dimensions of the digger, the driver's cab may be significantly (up to several meters) above ground level.

As a result of this, an operator of a mobile working machine typically adopts a downward sloping angle of vision from their driver's cab in order to see the floor area directly in front of the driver's cab. To enable good visibility of the working area, driver's cabs of mobile working machines have large window areas that help to maintain the best possible view out of the driver's cab.

However, due to legal requirements in a large number of countries, it is necessary that a steering wheel or similar is arranged in the center of the driver's cab in front of the driver's seat, via which the operator of the mobile working machine can communicate changes in direction of travel. The presence of the steering wheel is common for movement on the road in public areas.

In actual use of the mobile working machine on a construction site, however, the steering of the mobile working machine is often not carried out with the help of the steering wheel, but with a secondary steering system, namely a joystick. This provides the advantage that, in interaction with the steering via the joystick, combined control of the chassis, a rotary movement of the upper carriage and the tool provided on the upper carriage, for example a digger arm or the like, is possible. Accordingly, it is also possible to transmit the steering commands that can be entered via the primary steering system with the aid of the secondary steering system, wherein this is usually done in a less intuitive manner than with the primary steering system.

During the operation of a mobile working machine, visibility is always restricted in the vicinity of the driver's cab, as the primary steering system is located directly in the operator's favored field of view.

It is the object of the present disclosure to provide a mobile working machine that allows improved visibility for the operator of a mobile working machine out of the driver's cab.

This is achieved with a mobile working machine as described herein.

According to the invention, it is provided that the mobile working machine, in particular a digger, comprises a driver's cab for accommodating an operator of the mobile working machine, a control station for the operator, in particular a seat, arranged in the driver's cab, a primary steering system, in particular a steering wheel, arranged in front of the control station in the direction of travel of the mobile working machine, and a secondary steering system, in particular a joystick, arranged laterally offset from the control station in the direction of travel of the mobile working machine. The mobile working machine is characterized in that the primary steering system has a steering column section, which cooperates with a steering column mount to transmit a steering actuation to a control unit implementing the desired steering movement, wherein the steering column section and the steering column mount can be connected to each other in a rotationally fixed manner via a plug-in connection, such that the operator is able to dismount the primary steering system depending on a perceived visual restriction.

According to the invention, it is also possible to unplug the primary steering system, for example a steering wheel with a steering column section firmly connected thereto, from a steering column mount by means of a plug-in connection and to store it in a place that does not obstruct the line of sight from the driver's cab during a work operation that requires a particularly good view in the vicinity of the front cab.

The control commands that could previously be entered via the primary steering system are then transmitted by means of the secondary steering system, should this be necessary.

According to an advantageous modification of the present invention, it can be provided that the plug-in connection is implemented with the aid of a quick coupling, which preferably releases the steering column section coupled to the steering column mount by actuating a locking mechanism, for example a foot pedal, preferably such that the steering column section can then be separated from the steering column mount by lifting it down.

In order to provide the easiest possible way of removing the primary steering system, the primary steering system is coupled with its steering column section to the steering column mount via a quick coupling. A quick coupling is a type of coupling that can be disconnected and connected by the operator without tools. For example, the quick coupling may be designed such that by operating a foot pedal, which may be attached to the steering column mount or the steering column section, the coupling of the steering column mount and steering column section can be disengaged so that the operator can remove the primary steering system by means of a lifting movement. The advantage of foot pedal release is that the operator then has two hands available to lift the steering wheel, so that it can be safely removed from the steering column mount and then immediately moved to a temporary storage location.

According to a development of the present invention, it can be provided that the driver's cab has a floor area, from which the steering column mount extends upwards.

The driver's cab usually has a floor panel or floor area that serves as a base for the components contained in the driver's cab. For example, a driver's seat or steering column mount is located on the floor panel or floor area. In mobile working machines, the steering column typically extends from the floor area of the driver's cab and is connected to a steering wheel at its end facing away from the floor, so that the operator of the mobile working machine can intuitively input steering actions by turning the steering wheel. Essentially, it can therefore be provided that, starting from the steering wheel, the rod-like steering column or the steering column section and the steering column mount extend towards the floor and penetrate the floor area, so that a detection of the steering signal can be made in an area located below the floor area or the floor panel of the driver's cab.

Preferably, it can be provided that the steering column mount protrudes less than 30 cm, preferably less than 20 cm, and in a preferred manner less than 10 cm from the floor area of the driver's cab. It is advantageous if the mount protrudes from the floor area as little as possible.

It is advantageous if the steering column mount, with which the steering column section of the primary steering system can optionally cooperate, does not project too far from the floor area into the interior of the driver's cab in a dismounted state of the primary steering system, as otherwise there would also be a restriction of the field of view for the operator and a risk of injury for the operator in the dismounted state of the steering column including the steering wheel. For this reason, it is desirable to limit the height of the steering column mount that protrudes into the interior of the driver's cab to less than 30 cm.

Furthermore, it can be provided that the steering column mount, i.e. the non-removable section, between the floor area of the driver's cab and the area for tethering the steering column section has a pivoting device with which the operator can adjust the primary steering system tiltably in a desired direction in a connected state. It is therefore not absolutely necessary for the steering column section and the steering column mount to have a continuous rectilinear shape in a connected state, as a bent shape is also possible due to the pivoting device. This is advantageous so that the operator can tilt the primary steering according to their needs to achieve a position that is as comfortable as possible for them.

According to an optional development of the present invention, it can be provided that the driver's cab has a windscreen, which preferably extends to a floor area of the driver's cab.

The windscreen, which extends into the floor area, enables the operator to have a sufficient view from their driver's seat into an area in the vicinity of the mobile working machine. The windscreen can extend to the floor area or floor panel of the driver's cab. Furthermore, it is possible that parts of the floor panel also have a window pane or are even part of the windscreen. This is possible, for example, if the windscreen is bent in a transition area between the floor panel and the windscreen and thus forms part of the floor panel.

According to an optional development of the present invention, it can be provided that the rotationally fixed connection of the steering column section and the steering column mount is implemented via a serrated toothing.

The serrated toothing provides a simple way of creating a rotationally fixed connection between two separable elements; for example, by giving the steering column section the shape of a hollow tube in its connection area, which is provided with a corresponding toothed structure on its inner circumference. The corresponding connection area of the steering column mount is of complementary design and may have a rod or tube shape with a matching tooth structure on its outer circumference. If the hollow tube of the steering column section is then pushed onto the steering column mount, which is, for example, rod-shaped, the respective tooth structures engage with each other, resulting in a rotationally fixed connection.

According to the present invention, it can also be provided that a detection device is provided, which detects whether the steering column section cooperates with or is plugged onto the steering column mount and is properly locked for road travel, and transmits a corresponding signal to a machine control of the mobile working machine.

The detection device is designed to detect whether the steering column section and the steering column mount are in an operative connection with each other, i.e. whether the primary steering system can be actuated. If this is the case, the detection device sends a corresponding signal to a machine control so that it knows the state of the primary steering system. The detection device may comprise a capacitance sensor, an induction sensor, a touch sensor or the like for detecting a correctly plugged-in steering column section.

Preferably, it can be provided that the machine control is designed to limit or reduce a maximum travel speed of the mobile working machine when the signal detected by the detection unit indicates that the steering column section and the steering column mount are separated from each other.

Since the primary steering system is the preferred way to control a steering input of the chassis of the working machine and the possibility of steering the chassis of the mobile working machine by means of the secondary steering system is much less common and intuitive for an operator, it is advantageous if the maximum travel speed of the mobile working machine is reduced when it is steered using the secondary steering system. This contributes to safety and, in particular, prevents the mobile working machine from being operated when high driving speeds are desired, where the use of primary steering system is advantageous for safety reasons.

According to a development of the present invention, it can also be provided that the machine control is designed to reduce the maximum travel speed of the mobile working machine to a value that enable safe driving of the vehicle, e.g. to a value of at most 20 km/h, preferably at most 15 km/h, and in a preferred manner at most 12 km/h.

Furthermore, according to an optional modification of the present invention, it can be provided that the machine control is designed not to provide or to remove a limitation on the maximum travel speed of the mobile working machine when the signal detected by the detection unit indicates that the steering column section and the steering column mount are operatively connected.

Any limitation of the maximum driving speed is therefore removed when the detection device detects that the primary steering system is functional.

According to an optional modification of the present invention, it can be provided that the steering column mount has, in the contact area with the steering column section, the configuration of a shaft with radially circumferential serrated toothing. A serrated toothing is a particularly advantageous way of implementing a rotationally fixed connection between two shaft sections that can be coupled to each other (steering column section and steering column mount).

Therefore, according to the invention, it can be provided, for example, that the steering column section has, in the contact area with the steering column mount, the configuration of a hollow shaft, which is provided with a serrated toothing on its inner circumference, wherein this serrated toothing is preferably matched to a serrated toothing of the steering column mount. Of course, the mount does not necessarily have to be designed as a hollow shaft. In principle, the hollow shaft can also be provided in the steering wheel and the power take-off shaft can be provided on the mount. This would have advantages with regard to the issue of pollution.

Furthermore, it can be provided that a locking unit is provided, which, once the steering column section has been plugged onto the steering column mount, prevents a relative movement, for example in the axial direction, of the steering column section with respect to the steering column mount. This locking unit prevents unintentional removal of the primary steering system from the steering column mount.

Advantageously, according to a further embodiment of the present invention, it can be provided that the locking unit has pins projecting laterally to the longitudinal extent of the steering column mount and/or the steering column section for hooking a latching lug.

The pins can be used as attachment points for the other parts to be attached. It is also conceivable that the part to be plugged in, which is to cooperate with the pins, has at least one labyrinth-like opening into which the pins are threaded so that it is no longer possible to pull them off easily. However, it is also conceivable to use latching lugs that are pretensioned with the aid of a spring, for example, and are deflected against their pretensioning force when plugged in, so that a respective latching lug engages behind an associated pin after the plugging-in process has been completed.

Accordingly, it can also be provided that the locking unit has a spring-biased latching lug on the steering column mount and/or on the steering column section in order to effect latching of the steering column section with the steering column mount when the steering column section is plugged onto the steering column mount.

BRIEF DESCRIPTION OF THE FIGURES

Further details, features and advancements of the disclosure can be seen in the following description of the figures. In the figures.

DETAILED DESCRIPTION

Figure 1:
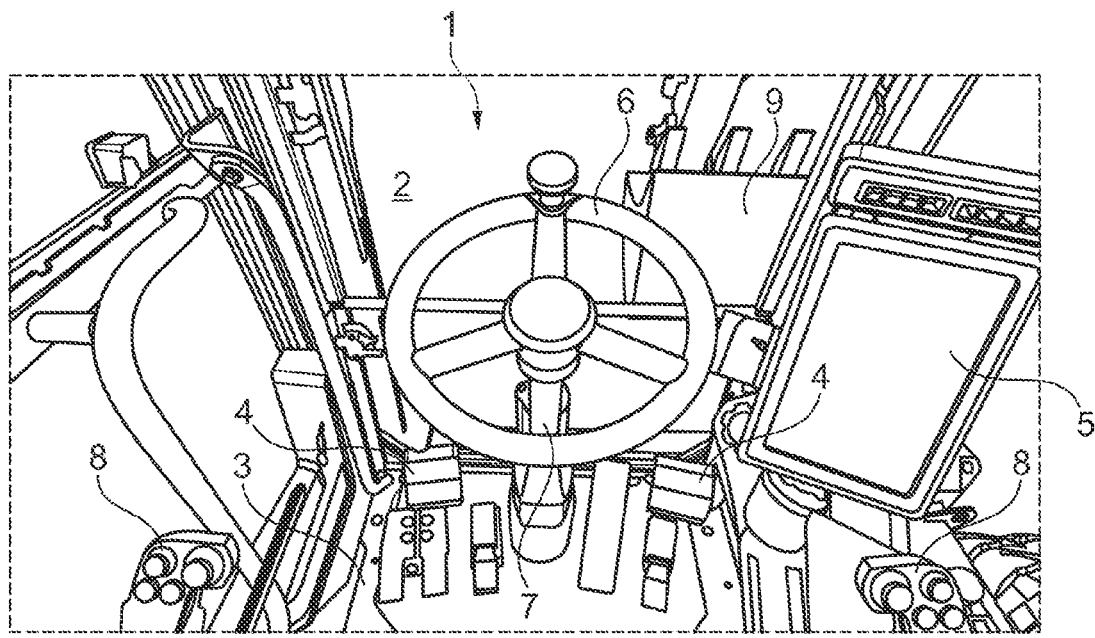
FIG. 1: shows a perspective representation of the operator's field of view of a mobile working machine from the driver's cab.

FIG. 1 shows a perspective representation of the operator's field of view from the driver's cab 1 of a mobile working machine. It is assumed that the operator of the mobile working machine sits in the seat of the driver's cab and looks out of the driver's cab in the normal downward direction. It can be seen that the view of the surroundings of the driver's cab 1 in the front area of the driver's cab 1 is unobstructed by the windscreen 2. To the left and right, as seen by the operator, there are also large window surfaces so that the operator's all-round view is restricted as little as possible. Furthermore, it can be seen that the driver's cab has a floor area 3 on which foot pedals 4 are provided for controlling the mobile working machine. In a road driving mode, for example, the right foot pedal 4 can take over the task of an accelerator pedal, whereas the left foot pedal 4 takes over the task of a brake. Furthermore, in the right-hand area of the field of view shown in FIG. 1, a display unit 5 can be seen on which information about the state of the mobile working machine can be displayed.

In addition, the primary steering system 6 is provided centrally, directly in front of the driver's seat, which inputs a steering command to the mobile working machine. The primary steering system 6 comprises a steering wheel that transmits a steering movement via a steering column 7 connected to the steering wheel.

In addition, in the lower edge area of FIG. 1, a secondary steering system 8 can be seen on both the left-hand side and the right-hand side, which is designed as a joystick in this case.

It can be seen how much the primary steering system 6 in the form of the steering wheel restricts the field of view of the operator of the mobile working machine, as it obstructs an unobstructed view of the floor area directly in front of the driver's cab. The primary steering system restricts the field of view in the vicinity of the mobile working machine. Furthermore, the digger bucket 9 belonging to the mobile working machine can also be seen, which has been illustrated as an exemplary working tool of the mobile working machine.

Figure 2:
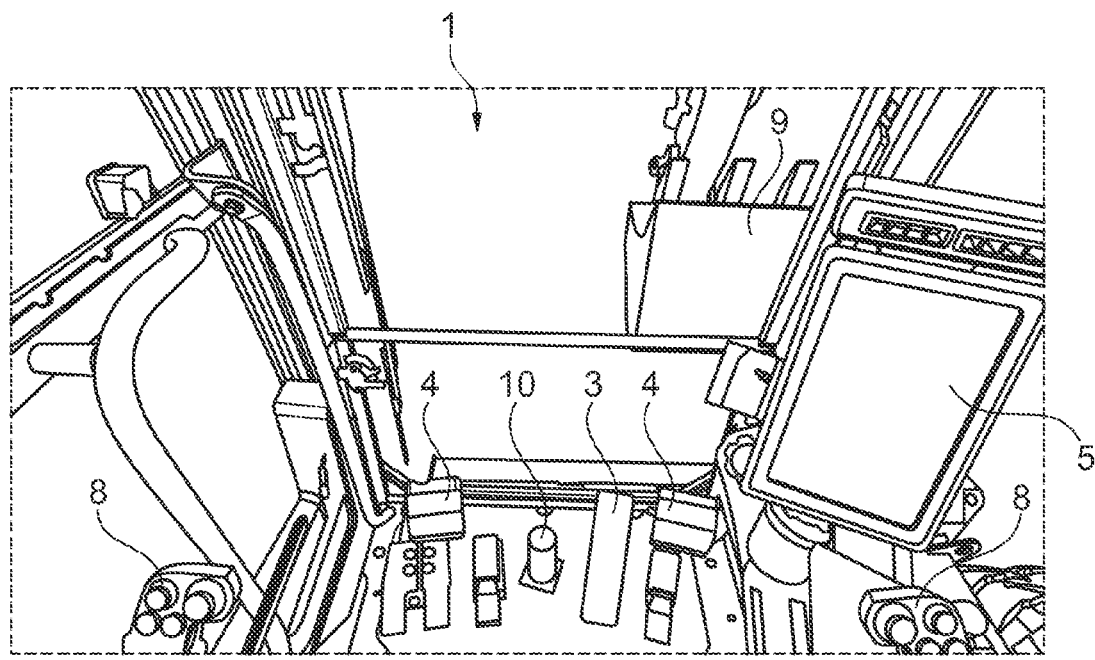
FIG. 2: shows a perspective representation of the operator's field of view of a mobile working machine from the driver's cab, where the steering wheel is delimited by an associated steering column section.

FIG. 2 now shows the same field of view starting from the operator located in the driver's cab 1, wherein, however, according to the idea of the invention, the primary steering system 6 has been delimited, whereby the field of view of the operator in the driver's cab 1 is significantly improved.

This can be immediately recognized by the fact that the floor area located close to the front of the driver's cab is clearly easier to see. For example, it is no longer possible that there is an obstruction of the view on the ground directly in front of the mobile working machine due to the primary steering system 6.

It can impressively be seen that the basic concept of the present disclosure significantly improves the operator's field of view in the driver's cab 1 and accordingly provides great added value. It is clear to a person skilled in the art that an improved field of view is also beneficial in terms of the danger posed by a mobile working machine, as the risk of accidents is reduced with better visibility for the operator.

Only the steering column mount 10 now protrudes from the floor area 3 of the driver's cab 1, but this is usually considerably less than 30 cm long and does not obstruct the field of view. In the state of the mobile working machine shown in FIG. 2, a steering actuation that was previously taken over by the primary steering system 6 is exerted by the secondary steering system 8. This means that the operator can now transmit a steering movement to the working machine with the joystick 8 instead of the steering wheel 6.

However, as this is less intuitive than operating a steering wheel 6, it may be provided for safety reasons that the maximum driving speed of the mobile working machine is reduced or limited in a state in which the primary steering system 6 is dismounted. A detection device is provided for this purpose, which detects whether the primary steering 6 is mounted or dismounted. If the primary steering system 6 is in a dismounted state, the detection device reports this to a machine control, which then limits the maximum driving speed of the mobile working machine in response. For example, it can be provided that in a configuration where the primary steering system 6 is not plugged in, the driving speed of the mobile working machine cannot exceed 20 km/h.

It can also be provided that when a removed steering wheel 6 is detected, the motor control automatically transfers the steering function to the secondary steering system without this having to be manually selected by the operator in a selection menu, for example with the aid of the display device 5.

Figure 3:
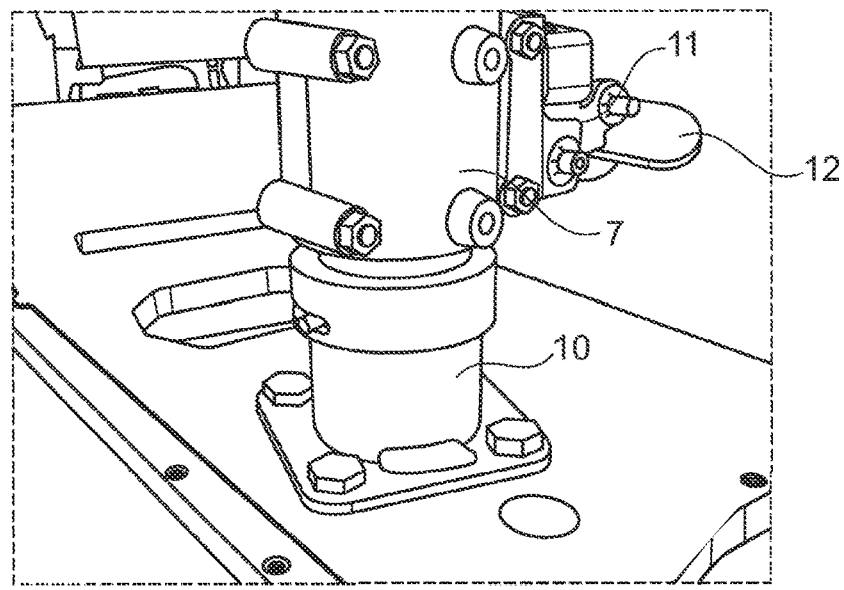
FIG. 3: shows a detailed view in the connection area of the steering column section and steering column mount.

FIG. 3 shows a possible implementation of the steering column mount 10 and a steering column section 7 connected thereto. In the present figure, it can be seen that the two components, i.e. the steering column section 7 and the steering column mount 10 engage with each other such that a steering movement (e.g. rotation) conveyed via the steering wheel 6 is transmitted via the steering column mount 10.

Furthermore, a locking mechanism 11 can be seen that can be transferred to an unlocked state by means of an unlocking device, in particular a foot pedal 12.

When this foot pedal 12 of the locking mechanism 11 is operated, an engagement existing between the steering column section 7 and the steering column mount 10 is released so that the operator can lift the primary steering system 6 (together with the steering column section 7) from the steering column mount 10.

Figure 4:
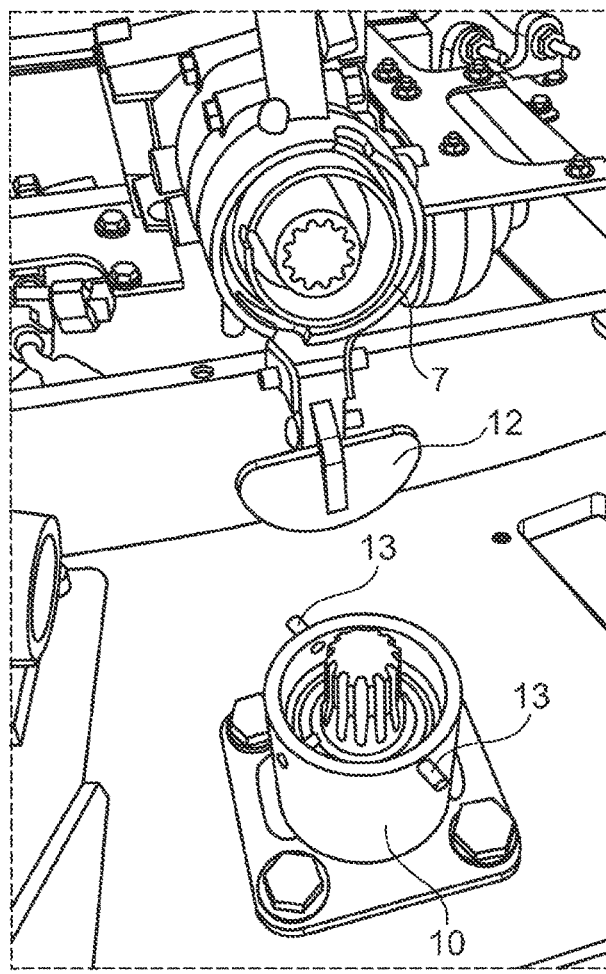
FIG. 4: shows a detailed view in the connection area of the steering column section and steering column mount, where the steering column section is delimited by the steering column mount.

FIG. 4 shows a representation in which the steering column mount 10 is separated from the steering column section 7. It can be seen that the steering column mount 10 has a shaft that has radial circumferential toothing at the end facing the interior of the driver's cab 1. This serrated toothing, in cooperation with the steering column mount 7, which, in the transition region to the steering column mount 10, can be designed, for example, as a hollow tube with internal toothing, ensures that a rotationally fixed connection is produced in a plugged-in state between the steering column mount 10 and the steering column mount 7.

In order to ensure that the primary steering system 6 is not unintentionally lifted off the steering column mount 10, a corresponding locking mechanism is provided that, in the implementation shown in FIG. 3, cooperates with the two pins 13 projecting laterally from the steering column mount 10.

The locking mechanism can be a labyrinth-like recess in a hollow tube on the steering column section 7, so that after the pins have been fitted and inserted into the recess, twisting of the two components means that unintentional lifting of the primary steering system 6 is not possible. Furthermore, it is also conceivable to have a latching mechanism that latches onto the steering column mount 10 when the steering column section 7 is fitted with the pins 13.

Figure 5:
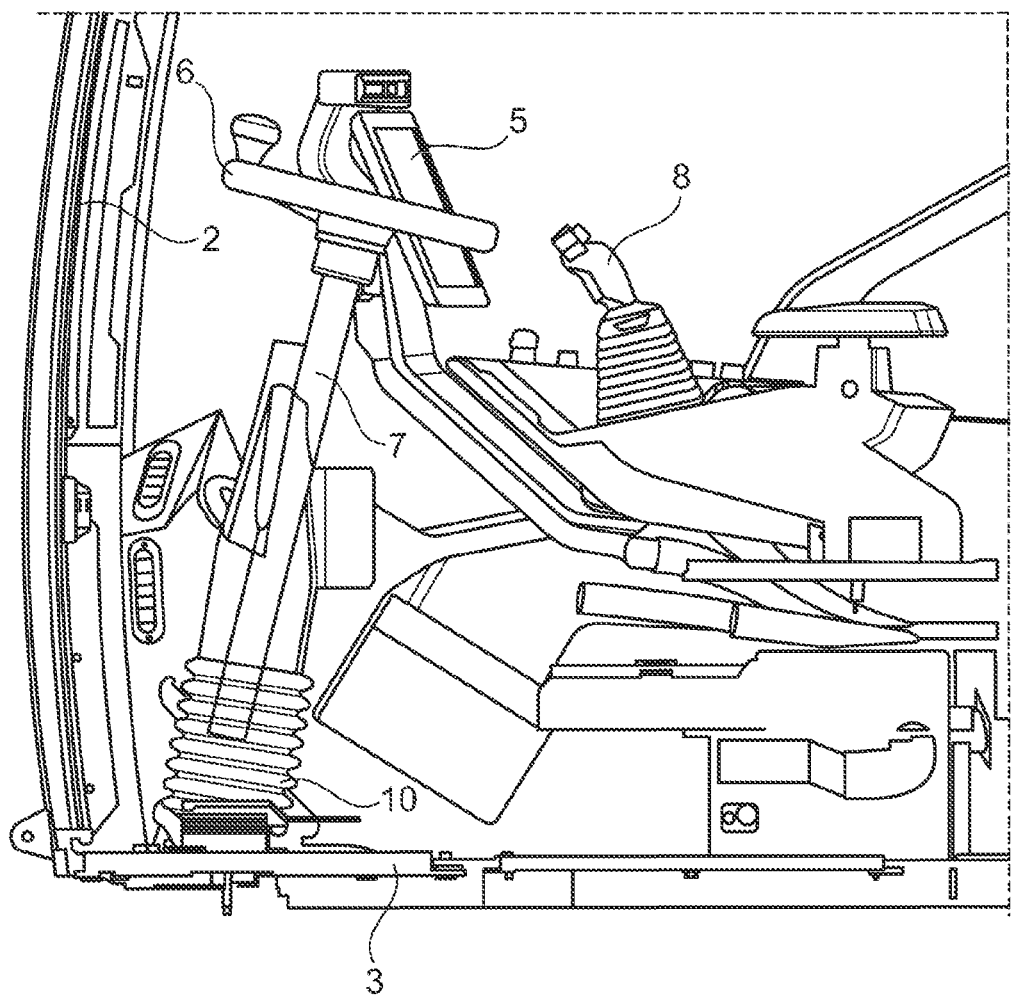
FIG. 5 shows a sectional view through a driver's cab of a mobile working machine.

FIG. 5 shows a sectional view through a driver's cab 1 of a mobile working machine. On the left-hand side of the driver's cab, the windscreen 2 can be seen, which extends towards a floor area 3. The steering column mount 10 (hidden by the rubber bellows in FIG. 5), on which the steering column section 7 of the primary steering system 6 is mounted, extends from the floor area 3 into the interior of the driver's cab 1. In order to increase the comfort for the operator in the cab 1, a tilting mechanism may be provided to allow the steering column 7 to be tilted.

This tilting mechanism is not dismounted when the primary steering system 6 is unplugged, but is part of the steering column mount 10. This means that the connection area for connecting the steering column section 7 is located above the tilting mechanism of the steering column mount 10.

It is further shown that the connection area of the steering column section 7 and the steering column mount 10 is surrounded by rubber bellows, which provide a cover for the connection area. However, this cover can also only be attached to the steering column section or steering column mount 10, so that the cover in the form of the rubber bellows can also be removed when the primary steering system 6 is dismounted. Furthermore, a person skilled in the art understands that the cover for the connection area of the steering column section 7 and the steering column mount 10 is not absolutely necessary, such that they can also dispense with it completely.

Furthermore, a joystick 8 can be seen at the side in the area of the seat of the operator of the driver's cab 1, which can be used as secondary steering system. Thus, if the primary steering system 6 is dismounted, the mobile working machine can continue to perform the same steering actions, wherein these are then not input via the primary steering system 6, but via the secondary steering system 8.

The disclosure described above now makes it possible for the operator of a mobile working machine to significantly improve their field of view into the front lower area of the mobile working machine, if required. This is achieved by removing the interfering steering column together with the steering wheel without tools, so that the steering wheel, which used to be directly in the field of view, no longer interferes with the field of view. The steering commands previously entered via the steering wheel can then continue to be entered with the aid of a secondary steering system, for example a joystick, so that the full functionality of the mobile working machine is guaranteed even if the primary steering system in the form of a steering wheel and steering column section is dismounted.

Instead of the mounted steering column, a kind of protective cap can protect the remaining steering column stub from dirt, dust or possible injury by means of the same latching or locking function. This protective cap always swaps places with the steering column. If the steering column is mounted in front of the driver, the protective cap is mounted on the balancing position. If, on the other hand, the steering column is mounted in the balancing position, the protective cap is mounted in front of the driver.

FIGS. 1-5 are drawn in proportion in terms of the respective views as noted herein, although other relative proportions and/or positioning may be used, if desired.

1-5 show example configurations with relative positioning of the various components. Unless otherwise noted, if shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. Mobile working machine, comprising:
   a driver's cab for accommodating an operator of the mobile working machine,
   a control station for the operator arranged in the driver's cab,
   a primary steering system arranged in front of the control station in the direction of travel of the mobile working machine, and
   a secondary steering system arranged laterally offset from the control station in the direction of travel of the mobile working machine,
   wherein
   the primary steering system has a steering column section, which cooperates with a steering column mount to transmit a steering actuation to a control unit implementing the desired steering movement, wherein
   the steering column section and the steering column mount can be connected to each other in a rotationally fixed manner via a plug-in connection, such that the operator is able to dismount the primary steering system depending on a perceived visual restriction.

2. Mobile working machine according to claim 1, wherein the plug-in connection is implemented with the aid of a quick coupling, which releases the steering column section coupled to the steering column mount by actuating a locking mechanism, such that the steering column section can then be separated from the steering column mount by lifting it down.

3. Mobile working machine according to claim 1, wherein the driver's cab has a floor area, from which the steering column mount extends upwards.

4. Mobile working machine according to claim 3, wherein the steering column mount protrudes less than 30 cm from the floor area of the driver's cab.

5. Mobile working machine according to claim 1, wherein the driver's cab has a windscreen, which extends to a floor area of the driver's cab.

6. Mobile working machine according to claim 1, wherein the rotationally fixed connection of the steering column section and the steering column mount is implemented via a form-fitting connection.

7. Mobile working machine according to claim 1, wherein a detection device is provided, which detects whether the steering column section cooperates with or is plugged onto the steering column mount and transmits a corresponding signal to a machine control of the mobile working machine.

8. Mobile working machine according to claim 7, wherein the machine control is designed to reduce a maximum travel speed of the mobile working machine when the signal detected by the detection indicates that the steering column section and the steering column mount are separated from each other.

9. Mobile working machine according to claim 8, wherein the machine control is designed to reduce the maximum travel speed of the mobile working machine to a value of at most 20 km/h.

10. Mobile working machine according to claim 7, wherein the machine control is designed not to provide or to remove a restriction on the maximum travel speed of the mobile working machine when the signal detected by the detection indicates that the steering column section and the steering column mount are operatively connected.

11. Mobile working machine according to claim 1, wherein the steering column mount has, in the contact area with the steering column section, the configuration of a shaft with form-fitting elements.

12. Mobile working machine according to claim 11, wherein the steering column section has, in the contact area with the steering column mount, the configuration of a hollow shaft, which is provided with a serrated toothing on its inner circumference, wherein this serrated toothing is matched to a serrated toothing of the steering column mount.

13. Mobile working machine according to claim 12, wherein the locking unit has pins projecting laterally to the longitudinal extent of the steering column mount and/or the steering column section for hooking a latching lug.

14. Mobile working machine according to claim 12, wherein the locking unit has a spring-biased latching lug on the steering column mount and/or on the steering column section in order to effect latching of the steering column section with the steering column mount when the steering column section is plugged onto the steering column mount.

15. Mobile working machine according to claim 1, wherein a locking unit is provided, which, once the steering column section has been plugged onto the steering column mount, prevents all relative movements of the steering column section with respect to the steering column mount.

16. Mobile working machine according to claim 1, wherein the mobile work machine is a digger, wherein the control station for the operator is a seat, wherein the primary steering system is a steering wheel, and the secondary steering system is a joystick.

* * * * *